United States Patent
Kim et al.

(10) Patent No.: US 12,395,432 B2
(45) Date of Patent: Aug. 19, 2025

(54) SWITCH-BASED WORKLOAD DISTRIBUTION FOR VIRTUALIZED RANs

(71) Applicant: Microsoft Technology Licensing, LLC, Redmond, WA (US)

(72) Inventors: Daehyeok Kim, Redmond, WA (US); Ilias Marinos, Redmond, WA (US); Anuj Kalia, Newcastle, WA (US); Manikanta Kotaru, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 17/331,782

(22) Filed: May 27, 2021

(65) Prior Publication Data

US 2022/0385577 A1 Dec. 1, 2022

(51) Int. Cl.
*H04L 47/12* (2022.01)
*H04L 12/46* (2006.01)
(Continued)

(52) U.S. Cl.
CPC .......... *H04L 47/12* (2013.01); *H04L 12/4641* (2013.01); *H04L 47/30* (2013.01);
(Continued)

(58) Field of Classification Search
CPC ..... H04L 47/12; H04L 12/4641; H04L 47/30; H04L 69/22; H04L 47/746; H04L 47/822;
(Continued)

(56) References Cited

U.S. PATENT DOCUMENTS

| 11,328,222 B1 * | 5/2022 | Matthews ........... H04L 47/2441 |
| 11,575,607 B2 * | 2/2023 | Palermo .................. H04L 47/62 |

(Continued)

OTHER PUBLICATIONS

Meirosu, et al., "DevOps for Software-Defined Telecom Infrastructures draft-unify-nfvrg-devops-05.txt", In Journal of Internet Engineering Task Force, Jul. 8, 2016, pp. 1-25.

(Continued)

*Primary Examiner* — Jung H Park

(57) ABSTRACT

Aspects of the present disclosure relate to allocating workloads to vRANs via programmable switches at far-edge cloud datacenters. Traditionally, traffic allocation is handled by dedicated servers running load-balancing software. However, rerouting RAN traffic to such servers increases both energy and capital costs, degrades end-to-end performance, and requires additional physical space, all of which are undesirable or even infeasible for a RAN far-edge datacenter. Since switches are located in the path of data traffic, workflow policies can be designed to inspect packet headers of incoming traffic, evaluate real-time network information, determine available vRAN instances, and update the packet headers to steer the incoming traffic for processing. As network conditions change, the workflow policies enable the switch to dynamically redirect workloads to alternative vRANs for processing. As a result, RAN processing efficiency and fault tolerance are improved—even with changing network conditions and spikes in data traffic.

20 Claims, 11 Drawing Sheets

(51) Int. Cl.
*H04L 47/30* (2022.01)
*H04L 69/22* (2022.01)
*H04W 24/04* (2009.01)
*H04W 28/084* (2023.01)
*H04W 84/04* (2009.01)

(52) U.S. Cl.
CPC ............ *H04L 69/22* (2013.01); *H04W 24/04* (2013.01); *H04W 28/084* (2023.05); *H04W 84/042* (2013.01)

(58) Field of Classification Search
CPC ............ H04L 67/1008; H04L 41/0894; H04L 41/0895; H04L 47/726; H04L 47/78; H04L 47/828; H04L 43/0805; H04L 43/0888; H04W 24/04; H04W 28/0289; H04W 84/042
See application file for complete search history.

(56) References Cited

U.S. PATENT DOCUMENTS

| | | | | |
|---|---|---|---|---|
| 11,720,425 | B1* | 8/2023 | Yang | G06F 9/547 |
| | | | | 709/203 |
| 2014/0133527 | A1* | 5/2014 | Dick | H03F 1/3247 |
| | | | | 375/219 |
| 2015/0110008 | A1* | 4/2015 | Puthenpura | H04W 24/02 |
| | | | | 370/329 |
| 2016/0105780 | A1* | 4/2016 | Hooker | H04W 64/003 |
| | | | | 370/338 |
| 2018/0254919 | A1* | 9/2018 | Van De Velde | H04L 45/66 |
| 2020/0177674 | A1* | 6/2020 | Liu | H04L 67/1031 |
| 2020/0336553 | A1* | 10/2020 | Yeddula | H04L 41/22 |
| 2020/0358184 | A1 | 11/2020 | Tran et al. | |
| 2021/0075730 | A1* | 3/2021 | Palermo | H04L 47/624 |
| 2021/0235278 | A1* | 7/2021 | Lu | H04W 16/18 |
| 2022/0030448 | A1* | 1/2022 | Takla | H04W 48/10 |
| 2022/0116854 | A1* | 4/2022 | Vidyashankar | H04L 12/1407 |
| 2022/0240199 | A1* | 7/2022 | Le | H04W 52/28 |
| 2022/0294848 | A1* | 9/2022 | Matthews | G06F 15/17318 |

OTHER PUBLICATIONS

"International Search Report & Written Opinion issued in PCT Application No. PCT/US22/027191", Mailed Date: Jul. 27, 2022, 21 Pages.

Communication pursuant to Rules 161(1) and 162 EPC received for European Application No. 22724572.7, mailed on Jan. 9, 2024, 3 pages.

* cited by examiner

SWITCH-BASED WORKLOAD DISTRIBUTION FOR VIRTUALIZED RANs

BACKGROUND

Demand for integration between a cloud network and a radio access network (RAN) and/or a core network for wireless telecommunications has rapidly increased. The RAN provides wireless connectivity to mobile computing devices by converting data into data packets. The core network coordinates among various parts of the RAN and provides connectivity to a packet-based network (e.g., the Internet). Traditional wireless telecommunications deployed servers with hardware that was specialized to particular types of processing and was typically built with a capacity to accommodate an estimated peak load of the network traffic. Use of cloud network technology, particularly virtual server technologies, has enabled decoupling of at least some wireless data processing from specialized hardware onto general-purpose servers. The general-purpose servers, combined with accelerators and the virtualization technologies, are able to dynamically change resource usage based on network demands.

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized datacenters to the network edge, closer to end users. MEC provides low latency, high bandwidth, and real-time access to RAN information. Distributing computing power enables the high volume of 5G devices and facilitates disaggregated, virtual RANs to create additional access points. Network Function Virtualization (NFV) replaces network functions like firewalls, load balancers, and routers with virtualized instances that run as software. Enhanced Common Public Radio Interface (eCPRI) can be used, for instance, for the fronthaul interface of a cloud RAN (e.g., for the real-time processing by the distributed unit (DU)).

As will be described further below, the cloud RAN for 5G comprises a distributed architecture including a Radio Unit (RU) at one or more cell towers and cloud servers at the network edge associated with one or more of a Distributed Unit (DU), a Central Unit (CU), and a RAN Intelligent Controller (RIC). The DU is associated with network switches and processes data in a series of operations associated with at least layer one (i.e., the "PHY" or physical layer) and layer two (the "MAC" or data link layer) of the Open Systems Interconnection (OSI) model. However, while there have been proposals to run PHY/MAC processing on multiple servers in the edge, it is still unclear how to distribute workloads (e.g., for processing IQ samples from cell towers) across servers. For instance, steering workloads in a correct and timely manner is critical in the RAN in various scenarios including load balancing, server failover, and maintenance.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by distributing workloads to virtual RANs ("vRANs") via programmable switches at far-edge cloud datacenters. Traditionally, network traffic allocation is handled by dedicated servers running load-balancing software. However, rerouting RAN traffic to such servers increases both energy and capital costs, degrades the end-to-end performance, and requires additional physical space, all of which are undesirable or even infeasible for a RAN far-edge datacenter—particularly in view of the heightened 5G performance requirements.

As described further herein, since switches are located in the path of data traffic, real-time network information (e.g., queue length, server state) can be leveraged for real-time RAN workload balancing. By leveraging the proximity and programmability of the switches, steering decision policies can be quickly applied on the RAN workloads without incurring the performance, energy, and capital cost overheads of traditional systems. In particular, the steering decision policies can be designed to enable a switch to inspect packet headers of incoming traffic, evaluate real-time network information, determine available vRAN instances (or "workers") to process the incoming traffic, and update the packet headers to steer the incoming traffic to the determined vRAN for processing—all essentially in real time. As network conditions change, the steering decision policies enable a programmable switch to dynamically redirect workloads to alternative vRANs for processing. As a result, with improved vRAN allocation, RAN processing efficiency and fault tolerance may improve—even in instances of changing network conditions and spikes in data traffic.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system implementing a cloud RAN in accordance to aspects of the present disclosure.

FIGS. 2A-B illustrate examples of a far-edge datacenter of a cloud RAN hosting virtual RAN instances in accordance with aspects of the present disclosure.

FIG. 3 illustrates a system depicting aspects of workload allocation to vRANs by a programmable switch associated with a far-edge datacenter of a cloud RAN in accordance with aspects of the present disclosure.

FIGS. 4A-B illustrate a system depicting aspects of dynamic workload reallocation for server failover or maintenance by a programmable switch associated with a far-edge datacenter of a cloud RAN in accordance with aspects of the present disclosure.

FIGS. 5A-B illustrate a system depicting aspects of dynamic workload reallocation for worker overload by a programmable switch associated with a far-edge datacenter of a cloud RAN in accordance with aspects of the present disclosure.

DETAILED DESCRIPTION

Figure 1:
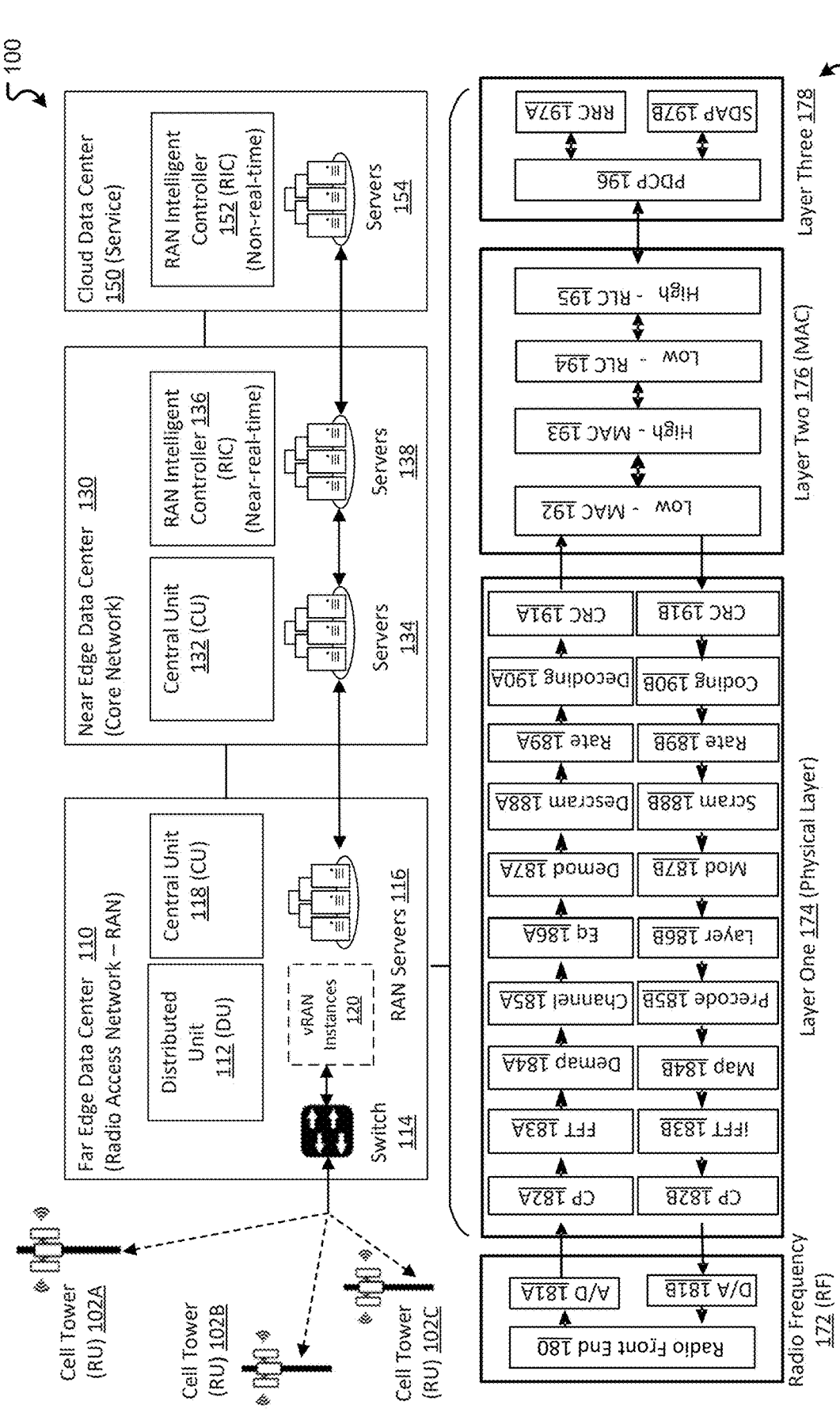

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

A mobile wireless telecommunication network may use a cloud service for implementing a RAN. In this case, the cloud service connects cell towers, with which mobile devices (e.g., smartphones) connect, to the public network (e.g., the Internet) and/or private networks. The cloud service provides virtual servers and other computing resources for dynamically scaling the computing capacity as needed based on the volume of data traffic. In aspects, a cloud RAN infrastructure represents an implementation of cloud services for the RAN. In contrast to a typical cloud service, the cloud RAN infrastructure includes geographical and physical constraints as well as latency constraints imposed by RAN standards. The cloud RAN infrastructure includes connection to at least one cell tower associated with a Radio Unit (RU) and cloud servers associated with one or more of a Distributed Unit (DU), a Central Unit (CU), and a RAN Intelligent Controller (RIC). The cell tower is in the field, where mobile devices connect over wireless cellular communications, and the RU of the cell tower connects to a DU of a RAN server at a far-edge datacenter. To enable real-time processing of RAN data traffic, the far-edge datacenter is relatively close (e.g., a few kilometers) to the cell tower.

As noted above, the DU is associated with network switches and processes data in a series of operations associated with at least layer one (i.e., the "PHY" or physical layer) and layer two (the "MAC" or data link layer) of the Open Systems Interconnection (OSI) model. The physical layer ("PHY") connects a data link layer device, e.g., "MAC" (medium access control), to a physical medium, e.g., optical fiber, copper cable. In aspects, a switch is a hardware device that connects devices on a digital network by using packet switching to receive and forward data to a destination device. Packet switching involves grouping the transmitted data into "packets." A "header" of each packet includes a "MAC address," which is a unique identifier used to direct the packet in the data link layer (layer two of the OSI model) to a destination device. A "payload" of each packet includes the transmitted data, which is ultimately extracted and used by application software. Some switches comprise application-specific integrated circuits (ASICs), which are integrated circuit chips programed for a specific use. These switches may also be referred to as "fixed-function" switches, which process packets according to fixed rules associated with a limited set of networking protocols. In contrast, programmable switches may be based on a protocol independent switch architecture (PISA), which enables developers to program each stage of packet processing. In this way, distinct treatment of different types of packets may be designed and implemented.

To meet 5G requirements, layers one and two need to be processed in essentially real time. In particular, steering workloads in a correct and timely manner is critical in the RAN in various scenarios including server failover and maintenance. However, while there have been proposals to run PHY/MAC processing on multiple servers in the edge, it is still unclear how to distribute workloads (e.g., for processing IQ samples from cell towers) across servers. Traditionally, network traffic allocation is handled by dedicated servers running load-balancing software. However, rerouting RAN traffic to such servers increases both energy and capital costs, degrades the end-to-end performance, and requires additional physical space, all of which are undesirable or even infeasible for a RAN far-edge datacenter—particularly in view of the heightened 5G performance requirements.

As discussed in more detail below, the present disclosure addresses the above and other issues by distributing workloads to virtual RANs ("vRANs") via programmable switches at far-edge cloud datacenters. Since switches are located in the path of data traffic, real-time network information (e.g., queue length, server state) can be leveraged for real-time RAN workload balancing. By leveraging the proximity and programmability of the switches, steering decision policies can be applied on the RAN workloads in real-time without incurring the performance, energy, and capital cost overheads of traditional systems. In particular, the steering decision policies can be designed to enable a switch to inspect packet headers of incoming traffic, evaluate real-time network information, determine available vRAN instances (or "workers") to process the incoming traffic, and update the packet headers to steer the incoming traffic to the determined vRAN for processing—all in essentially real time. As network conditions change, e.g., vRANs become overloaded (e.g., queue length increases), servers hosting the vRANs fail, power down (e.g., at night), or undergo maintenance, or the volume of data traffic fluctuates (e.g., during peak mobile usage periods), the steering decision policies enable a programmable switch to dynamically redirect workloads to alternative vRANs for processing. As a result, with improved vRAN allocation, RAN processing efficiency and fault tolerance may improve—even in instances of changing network conditions and spikes in data traffic.

FIG. 1 illustrates an overview of an example system 100 in which switch-based workload distribution may be implemented in accordance with the aspects of the present disclosure. Cell towers 102A-C transmit and receive wireless communications with mobile computing devices (e.g., smartphones) over a radio access network (RAN). The example system 100 further includes far-edge datacenter 110 (switches, RAN servers), near-edge datacenter 130 (core network servers), and cloud datacenter 150 (cloud services). In aspects, the example system 100 corresponds to a cloud RAN infrastructure for a mobile wireless telecommunication network.

The far-edge datacenter 110 is a datacenter that is part of the cloud RAN, which includes distributed unit 112 (DU) and central unit 118 (CU). In aspects, the far-edge datacenter 110 enables cloud integration with a radio access network (RAN). The far-edge datacenter 110 includes a switch 114 and RAN servers 116 configured to host vRAN instances 120 for processing RAN data. A virtual RAN (or "vRAN") is a type of RAN in which networking functions (including the control and data planes) are separated from the hardware that hosts the vRAN (e.g., RAN server(s) 116). In general, network function virtualization (NFV) involves enabling software to perform hardware-based functions, which enables increased responsiveness to network fluctuations and increased flexibility for enhancement since software can be upgraded or repaired more easily than hardware. In aspects, a vRAN instance 120 may be referred to as a "worker" for processing workflows.

The switch 114 and the RAN servers 116 process incoming data traffic and outgoing data traffic associated with layer one (the physical layer) 174 and at least a part of layer two (MAC) 176. In aspects, the far-edge datacenter 110 is generally geographically remote from the cloud datacenters associated with the core network and cloud services. The remote site is in proximity to the cell towers 102A-C. For example, the proximity in the present disclosure may be within a few kilometers or more. In aspects, the upstream data traffic corresponds to data flowing from the cell towers 102A-C to servers 154 in the cloud datacenter 150 (service). Similarly, the downstream data traffic corresponds to data flowing from the cloud datacenter 150 (service) to the cell towers.

The near-edge datacenter 130 (e.g., hosting the core network) includes a central unit 132 (CU) and RAN intelligent controller 136 (RIC) (near real-time processing, which may be less strictly time-sensitive than real-time processing). As illustrated, CU 132 is associated with servers 134 and RIC 136 is associated with servers 138. In aspects, the near-edge datacenter 130 is at a regional site of a private cloud service. For example, the regional site may be about tens of kilometers from the cell towers.

The cloud datacenter 150 (service) includes RIC 152 (non-real-time processing) associated with servers 154. For example, RIC 152 processes non-real-time service operations. In aspects, the cloud datacenter 150 may be at a central location in a cloud RAN infrastructure. For example, the central locations may be hundreds of kilometers from the cell towers.

In aspects, the far-edge datacenter 110, which is closer to the cell towers 102A-C than the cloud datacenter 150, provides real-time processing. In contrast, the cloud datacenter 150, which is the furthest from the cell towers 102A-C in the cloud RAN infrastructure, provides processing in a non-real-time manner.

The operational partitions 170 illustrate various operational segments for processing data traffic in the RAN. For example, the operational partitions 182-191 may correspond to layer one 174 processing and operational partitions 192-195 may correspond to layer two 176 processing of the OSI seven-layer model.

In aspects, conversion of data associated with a radio frequency 172 (RF) occurs prior to processing data at layer one 174. For radio frequency 172 (RF) data processing, the radio front-end partition receives and sends data through the cell towers 102A-C to mobile computing devices over wireless communications. The A/D 181A converts analog data from the radio front-end to digital data for the upstream data traffic. The D/A 181B converts digital data into analog data for the downstream data traffic. In aspects, the interface between DU and RU in a cloud RAN is referred to as "Fronthaul." The Fronthaul defines a number of "planes" of operations, including the "c-plane" (control plane), the "u-plane" (user plane), the "s-plane" (synchronization plane), and the "m-plane" (management plane). In general, c-plane data is directed to scheduling and coordination of data transmission, u-plane data is directed to efficient data transfer (e.g., defined by 5G specifications), s-plane data is directed to timing and synchronization of data transmission between RU and DU, and m-plane data relates to managing the RU. Packets having data payloads related to the different planes of operation comprise corresponding header information, e.g. a "c-plane header," "u-plane header," etc.

Partitions in layer one 174 (physical layer) may be associated with operations for converting coded symbols associated with a bit stream into a physical signal for transmission using communication media (e.g., a physical wire or radio). In aspects, the operational partitions for processing upstream data traffic of the physical layer may include, CP 182A, FFT 183A, Demap 184A, Channel 185A, Eq 186A, Demod 187A, Descram 188A, Rate 189A, Decoding 190A, and CRC 191A. The operational partitions for processing downstream data traffic in the physical layer may include, CRC 191B, Coding 190A, Rate 189B, Scram 188B, Mod 187B, Layer 186B, Precode 185B, Map 184B, iFFT 183B, and CP 182B.

Partitions in layer two 176 (media access control—MAC) may be associated with operations for transferring data frames between network hosts over a physical link. In aspects, partitions in layer two correspond to the data link layer in the OSI seven-layer model. Low-MAC 192 is the lowest partition in the layer two 176. Other partitions above the Low-MAC 192 include, an ascending sequence of layers, High-MAC 193, Low-Radio Link Control (RLC) 194, and High-RLC 195.

Partitions in the layer three 178 may be associated with operations for forwarding data packets through routers. In aspects, layer three 178 corresponds to the network layer in the OSI seven-layer model. The partitions in layer three 178 may be associated with protocol-governed operations such as Packet Data Convergence Protocol 196 (PDCP), Radio Resource Control 197A (RRC) and Service Data Adaptation Protocol 197B (SDAP).

In aspects, a combination of DU 112 and CU 118 in the far-edge datacenter 110 may process partitions associated with layer one 174, layer two 176, and at least a part of layer three 178. In particular, respective servers of RAN servers 116 include central processors (CPUs) and a variety of accelerators for processing data associated with one or more partitions of the operational partitions 170.

As previously noted, to meet 5G requirements, layers one and two need to be processed in essentially real time. In particular, steering workloads in a correct and timely manner is critical in the RAN in various scenarios including server failover and maintenance. For example, RAN workloads may include processing IQ samples from cell towers. Quadrature signals, also called IQ signals, IQ data or IQ samples, are often used in radio frequency (RF) applications, such as a RAN. IQ samples form the basis of complex RF signal modulation and demodulation, both in hardware and in software, as well as in complex signal analysis. To facilitate transmission of this type of data, IQ samples are often compressed and are transmitted via u-plane data packets with corresponding u-plane headers. Again, this type of RAN data requires real-time processing to meet latency and other performance metrics of 5G.

Traditionally, network traffic allocation is handled by dedicated servers running load-balancing software. However, rerouting RAN traffic to such servers increases both energy and capital costs, degrades the end-to-end performance, and requires additional physical space, all of which are undesirable or even infeasible for a RAN far-edge datacenter. The present disclosure addresses this issue by distributing workloads to vRAN instances 120 via programmable switches 114 at the far-edge datacenter 110. As illustrated by FIG. 1, switch 114 is located in the path of data traffic at the interface between the RU and DU cloud infrastructure components.

In aspects, since switch 114 is in the path of the data traffic, switch 114 is able to gather real-time packet, network, and resource information. By leveraging programmability of switch 114, steering decision policies (or "workflow allocation policies") can be applied on the RAN workloads without incurring the performance, energy, and capital cost overheads of traditional server-based systems. The workflow allocation policies may be customized for the RAN infrastructure. For instance, the policies may programmatically enable the switch 114 to recognize different types of RAN data based on inspecting packet headers. That is, whereas data packets associated with different operational planes may be interleved within a transmission stream, switch 114 may be programmed identify packets in the u-plane from packets in the c-plane by inspecting a plane field in the packet header. Furthermore, switch 114 may be programmed to process packets in different planes differently—giving preference to packets requiring real-time processing over packets with less stringent processing requirements. Additionally or alternatively, the switch 114 may recognize RAN data originating from a particular cell tower (e.g., based on a cell ID, subcarrier ID, etc.), for instance. In this way, by modifying packet headers originating at the particular cell tower, the corresponding RAN data may be directed to a particular vRAN destination.

Switch 114 may also be programmed to take different actions based on network or resource conditions. For instance, policies may enable switch 114 to recognize when a vRAN is becoming overloaded (e.g., based on queue length) or when a server has failed, powered down or is ungoing maintenance. Switch 114 may redirect data traffic to an available vRAN by revising a destination address in the packet header of a redirected packet (or packets). Since the switch 114 is in the path of the upstream and downstream traffic, fluctuations in the volume of data traffic may also be observed and addressed by switch 114. In some cases, the switch 114 may enable deployment of additional vRANs and/or reduce the number of vRANs allocated for RAN workload processing. As a result, with improved vRAN allocation, RAN processing efficiency and fault tolerance may improve—even in instances of changing network conditions or resources and spikes in data traffic.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
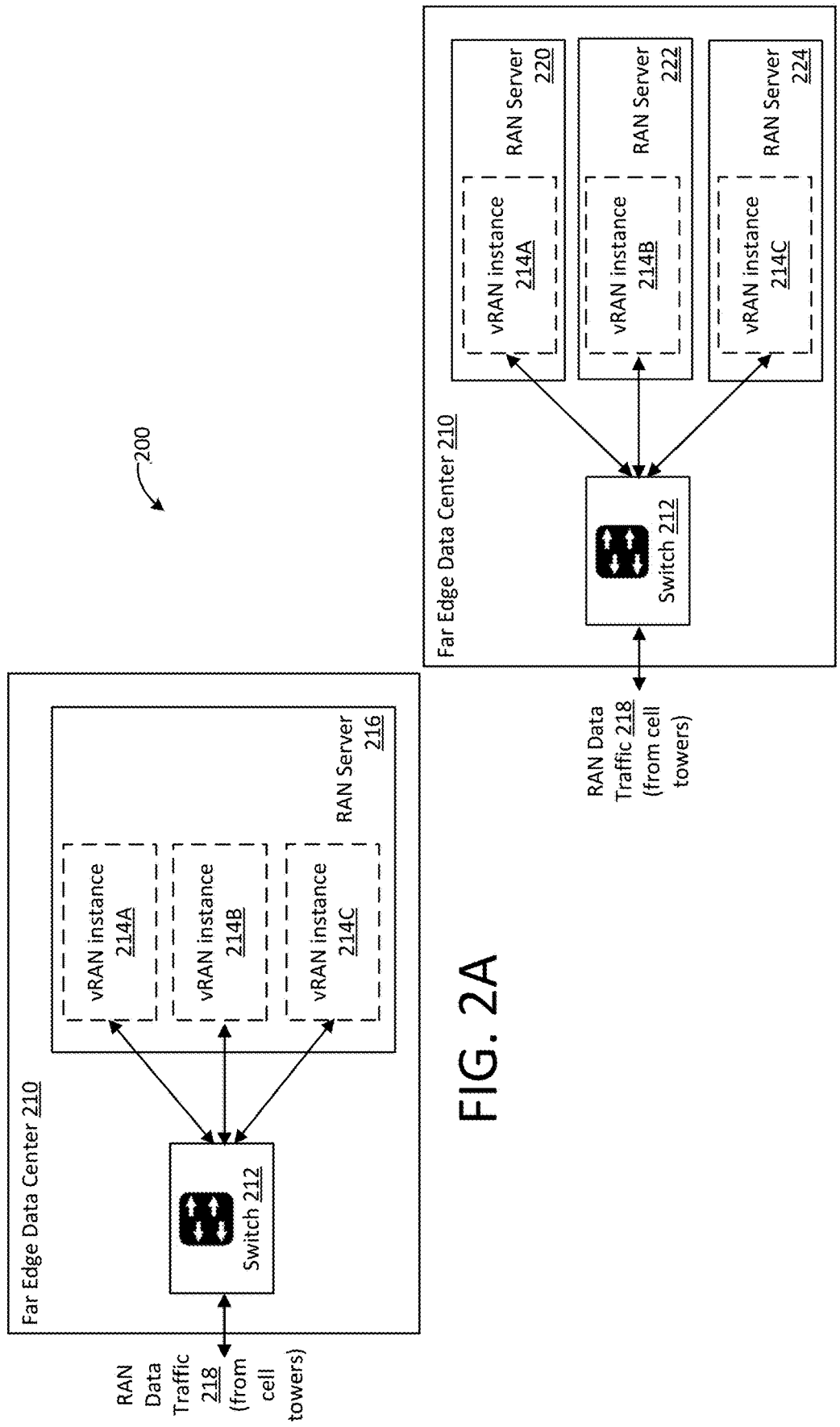

FIG. 2A illustrates a first example of a far-edge datacenter 210 of RAN environment 200. The far-edge datacenter 210 includes at least a switch 212, vRAN instances 214A-C, and RAN server 216. The switch 212 connects the cell towers (e.g., the cell towers 102A-C, as shown in FIG. 1) with RAN server 216, which hosts vRAN instances (or "vRANs") 214A-C, at far-edge datacenter 210. As illustrated, vRAN instances 214A-C of FIG. 2A are hosted by a single server 216. Similarly, FIG. 2B illustrates a second example of far-edge datacenter 210. In this case, far-edge datacenter 210 includes a switch 212, vRAN instances 214A-C, and RAN servers 220, 222, and 224. In the case of FIG. 2B, the switch 212 connects the cell towers (e.g., the cell towers 102A-C, as shown in FIG. 1) with RAN server 220 (which hosts vRAN instance 214A), RAN server 222 (which hosts vRAN instance 214B), and RAN server 224 (which hosts vRAN instance 214C), at far-edge datacenter 210. As illustrated, vRAN instances 214A-C of FIG. 2B are hosted by multiple servers 220, 222, 224.

In aspects, the switch 212 is a programmable switch. Since switch 212 is located in the path of RAN data traffic 218, real-time network information (e.g., queue length, server state) can be leveraged for RAN workload balancing. By leveraging the programmability of switch 212, policies can be applied on the RAN workloads without incurring the performance, energy, and capital cost overheads of traditional systems (e.g., systems using allocated servers implementing software-based load balancing). In particular, one or more programs encoding workflow allocation policies can be designed to enable switch 212 to inspect packet headers of incoming RAN data traffic 218, evaluate real-time network information, determine available vRAN instances 214A-C (or "workers") to process the incoming RAN data traffic 218, and update packet headers to steer the incoming RAN data traffic 218 to the determined vRAN for processing. In some cases, the policies enable switch 212 to prioritize some workloads for real-time processing, whereas other workloads may be identified for near real-time processing or even higher latency processing. As network conditions change, e.g., one or more of vRAN instances 214A-C become overloaded (e.g., queue length increases), one or more of the servers fail or undergo maintenance (e.g., servers 216, 220, 222, 224 hosting the vRANs 214A-C), or the volume of RAN data traffic 218 fluctuates (e.g., during peak mobile usage periods), the workflow allocation policies enable switch 212 to dynamically redirect workloads to alternative vRANs for processing. As a result, with improved vRAN allocation, RAN processing efficiency and fault tolerance may improve—even in instances of changing network conditions and spikes in RAN data traffic 218.

Figure 3:
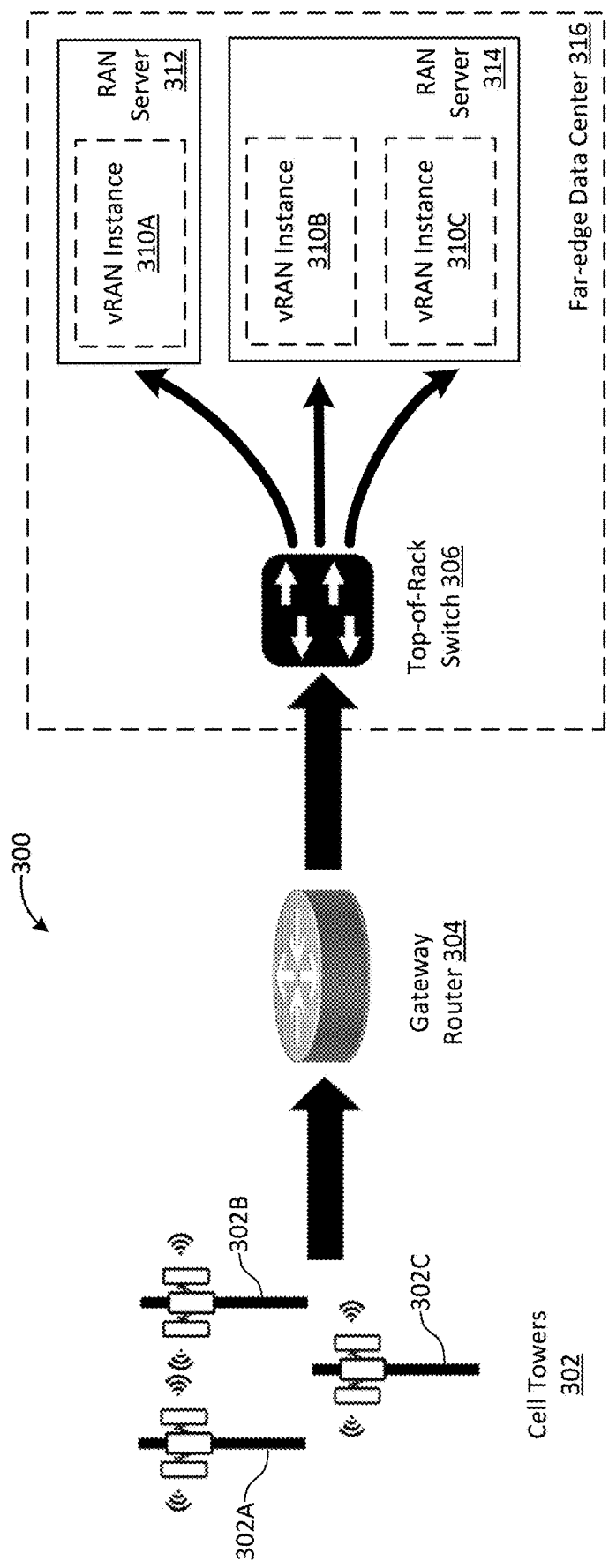

FIG. 3 illustrates a system 300 depicting aspects of workload allocation to vRANs by a programmable switch 306 associated with a far-edge datacenter 316 of a cloud RAN. As illustrated, system 300 comprises cell towers 302A-C, gateway router 304, and far-edge data center 316. The gateway router 304 may be at the interface between cell towers 302 and an internet service provider (ISP). In aspects, gateway router 304 may detect a level of incoming data traffic to the ISP. In examples, the ISP may host a private cloud network including far-edge data center 316. Far-edge data center 316 comprises switch 306 and RAN servers 312 and 314. In this configuration, RAN server 312 hosts vRAN instance 310A and RAN server 314 hosts vRAN instances 310B-C.

Switch 306 may be a programmable "top-of-rack" (ToR) switch. In aspects, switches can be incorporated with servers in multiple configurations. Two common infrastructure designs are Top of Rack (ToR) and End of Row (EoR). In the ToR design, servers 312, 314 may connect to switch 306 installed in the rack of servers, which provides the benefit of maintaining all copper cabling between the server and the switch within the rack itself. Switch 306 then links the rack to the far-edge datacenter 316 network at a common aggregation point. In this example, each rack can be treated as a modular unit. In an EoR design, each of servers 312, 314 in a rack are connected to a common aggregation switch directly without connecting to individual switches on each rack. Racks are typically lined up in a row and EoR switch(es) are provided at the end of the row so, in this example, each row acts as a unit.

As described above, switch 306 may be loaded with one or more programs encoding workflow allocation policies that are designed to enable switch 306 to inspect packet headers of incoming RAN data traffic, evaluate real-time network information, determine available vRAN instances 310A-C (or "workers") to process the incoming RAN data traffic, and update packet packet headers to steer the incoming RAN data traffic to the determined vRAN for processing. In some cases, the policies enable switch 306 to prioritize some workloads for real-time processing, whereas other workloads may be identified for near real-time processing or even higher latency processing. As network conditions change, e.g., one or more of vRAN instances 310A-C become overloaded (e.g., queue length increases), one or more of the servers fail or undergo maintenance (e.g., servers 312, 314 hosting the vRANs 310A-C), or the volume of RAN data traffic fluctuates (e.g., during peak mobile usage periods), the workflow allocation policies enable switch 306 to dynamically redirect workloads to alternative vRANs for processing.

It will be appreciated that while system 300 is illustrated as comprising two servers 312 and 314, and three vRAN instances 310A-C, any number of servers or vRAN instances may be used.

Figure 4A:
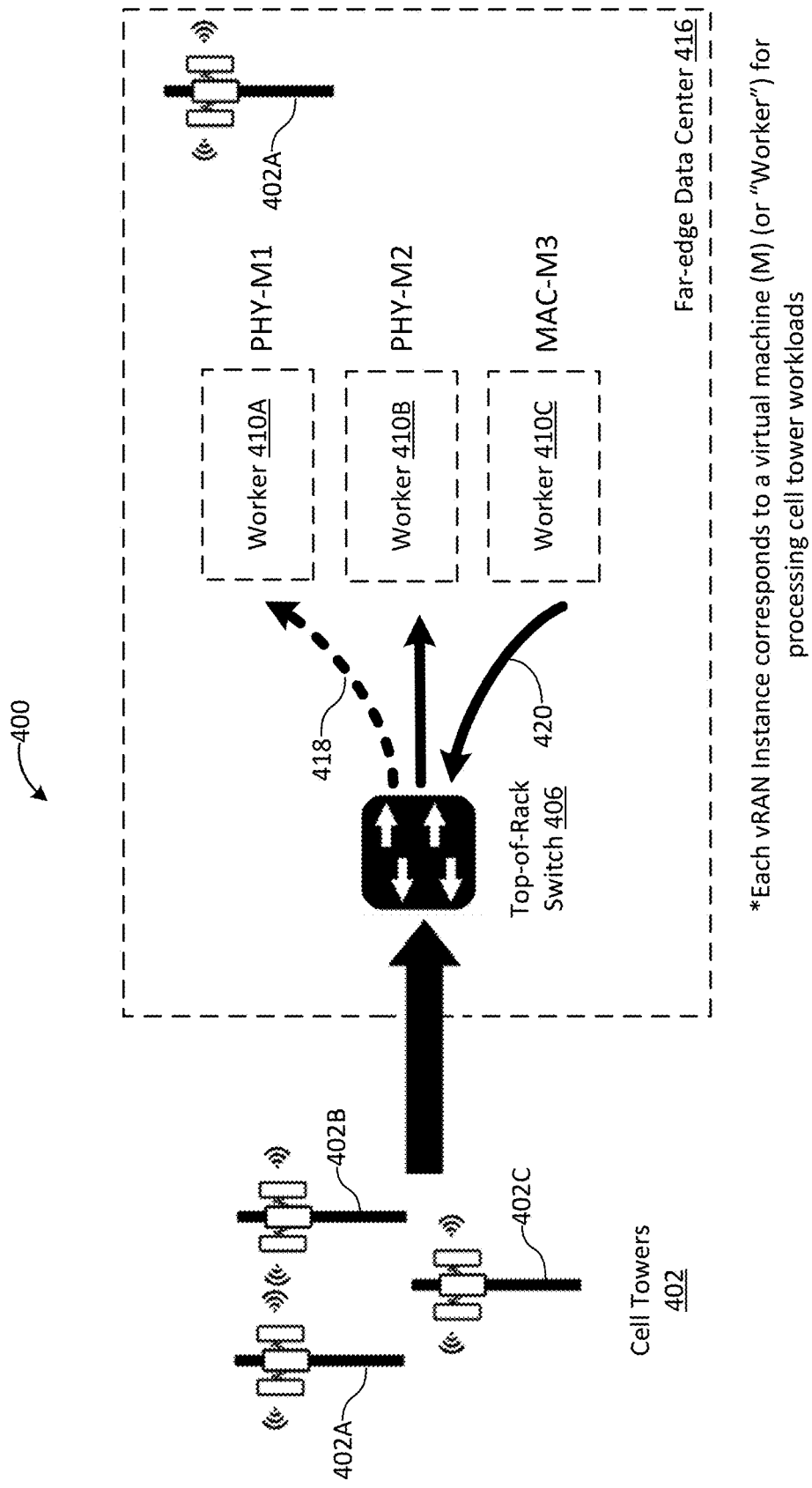
Figure 4B:
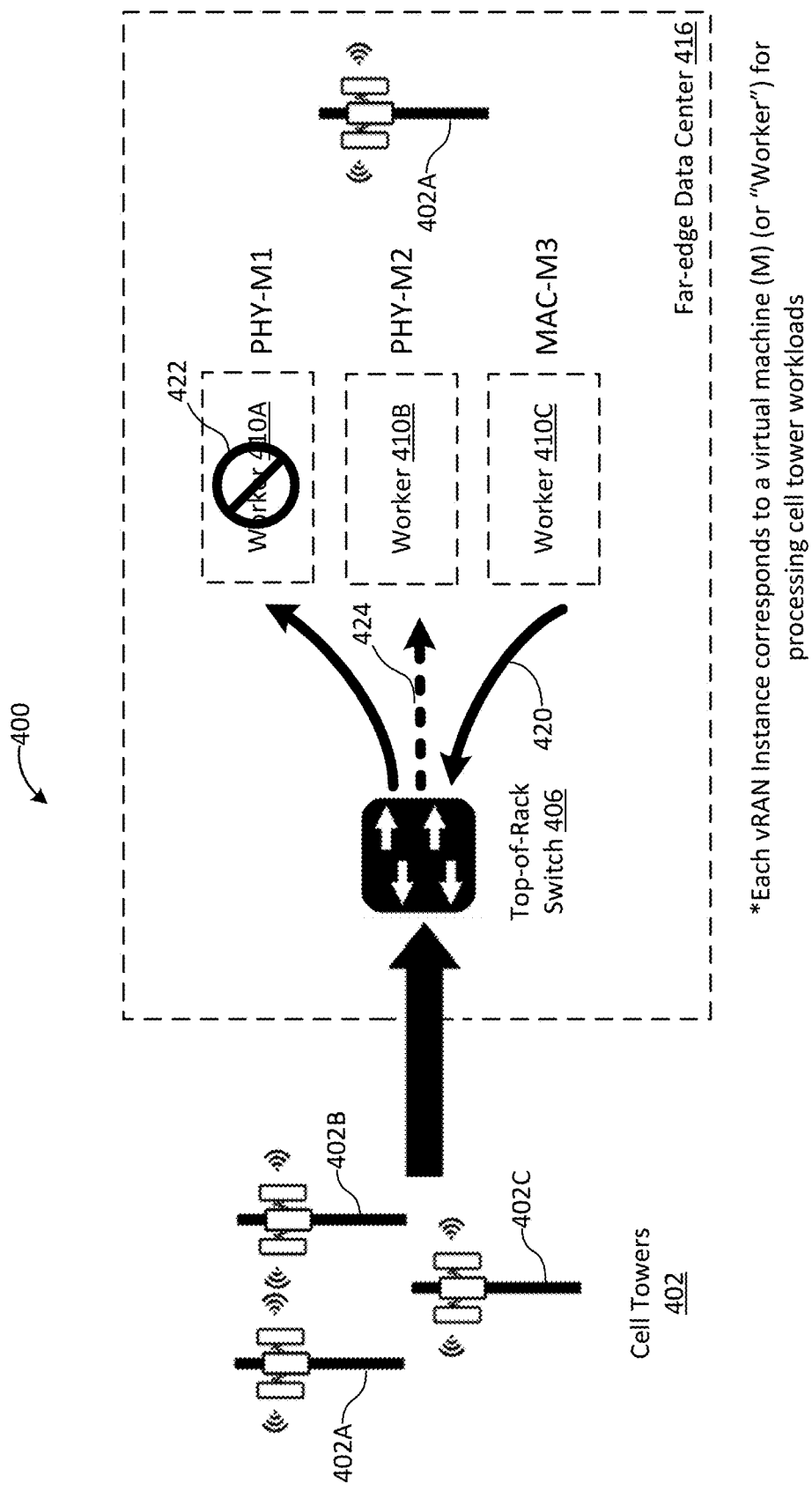

FIGS. 4A-B illustrate a system 400 depicting aspects of dynamic workload reallocation for server failover or maintenance by a programmable switch associated with a far-edge datacenter of a cloud RAN. As illustrated by FIG. 4A, system 400 comprises cell towers 402A-C and far-edge data center 416. Far-edge data center 416 comprises switch 406 (e.g., a ToR switch) and workers 410A-C, where each worker may correspond to a vRAN instance. While any combination of one or more RAN servers may host workers 410A-C, the RAN servers are not depicted in FIG. 4A.

Switch 406 may be a programmable switch, as described above, and may execute one or more policies for monitoring and keeping track of load information, making traffic steering decisions, and implementing the traffic steering decisions. For instance, the switch 406 may monitor a "system load" of data traffic based on a level of ingress data traffic at an ingress port and/or a level of egress data traffic at an egress port of switch. The switch 406 may further detect an availability of resources, such as vRAN instances, based on a "worker traffic allocation," which refers to a volume of data traffic directed to each worker from the switch. To determine whether a worker is becoming overloaded, the switch 406 may monitor a queue length for each worker 410A-C, where the queue length corresponds to a "worker load" or "workload" for each worker. Increased queue length may signal that the worker 410A-C is becoming overloaded, which may be due to the worker traffic allocation being too high and/or the processing of workflows by the worker 410A-C being too slow. In aspects, the switch 406 may also be able to detect resource conditions, such as a "server state" of one or more servers hosting the workers 410A-C. In aspects, server states may include "running state," "failure state," "offline state," and the like. When a server transitions from a running state to a failure state (e.g., when the server is experiencing a hardware or software failure) or an offline state (e.g., when the server is offline to undergo maintenance or powered-down for resource conservation), workers hosted by the server may become unavailable for processing workflows.

Switch 406 may further be configured, based on the policies, to make traffic steering decisions based on the system load, the worker load, and/or resource conditions (e.g., server state). For instance, switch 406 may map traffic from a particular cell tower to a particular worker. In response to making the traffic steering decisions (e.g., the cell-worker mapping), switch 406 may implement the traffic steering decision by altering packet headers of data traffic from the particular cell tower to specify the particular worker as the destination of the data traffic. In an example, switch 406 may determine that worker 410A is available and may make a decision to direct RAN data traffic from cell tower 402A to worker 410A for processing. In response to the decision, as illustrated by dashed arrow 418, switch 406 may inspect RAN-specific packet headers (e.g., cell ID, subcarrier ID, etc.) to identify data traffic from cell tower 402A and may modify the packet headers to specify worker 410A as the destination. A workload performed by worker 410A may comprise layer one (PHY) processing of the RAN data traffic from cell tower 402A. In aspects, it may be necessary for worker 410A to perform the layer one (PHY) processing in real-time. In contrast, worker 410C may perform layer two (MAC) processing on RAN data and may direct the processed RAN data traffic back to switch 406, as illustrated by arrow 420.

Similar to FIG. 4A, FIG. 4B illustrates system 400 including cell towers 402A-C and far-edge data center 416. Far-edge data center 416 comprises switch 406 (e.g., a ToR switch) and workers 410A-C, where each worker may correspond to a vRAN instance. In this case, switch 406 has detected that worker 410A has become unavailable, as illustrated by fault symbol 422. For instance, it may be detected that a server (not shown) hosting worker 410A has transitioned to a failure state or an offline state and no longer supports worker 410A.

In this example, switch 406 may determine that worker 410B is available and may make a decision to redirect the RAN data traffic from cell tower 402A to worker 410B for processing. In response to the decision, as illustrated by dashed arrow 424, switch 406 may inspect RAN-specific packet headers (e.g., cell ID, subcarrier ID, etc.) to identify data traffic from cell tower 402A and may modify the packet headers to specify worker 410B as the destination. The workload performed by worker 410B may also comprise layer one (PHY) processing of the RAN data traffic from cell tower 402A. In aspects, it may be necessary for worker 410B to perform the layer one (PHY) processing in real-time. Similar to FIG. 4A, worker 410C may perform layer two (MAC) processing on RAN data and may direct the processed RAN data traffic back to switch 406, as illustrated by arrow 420.

Figure 5A:
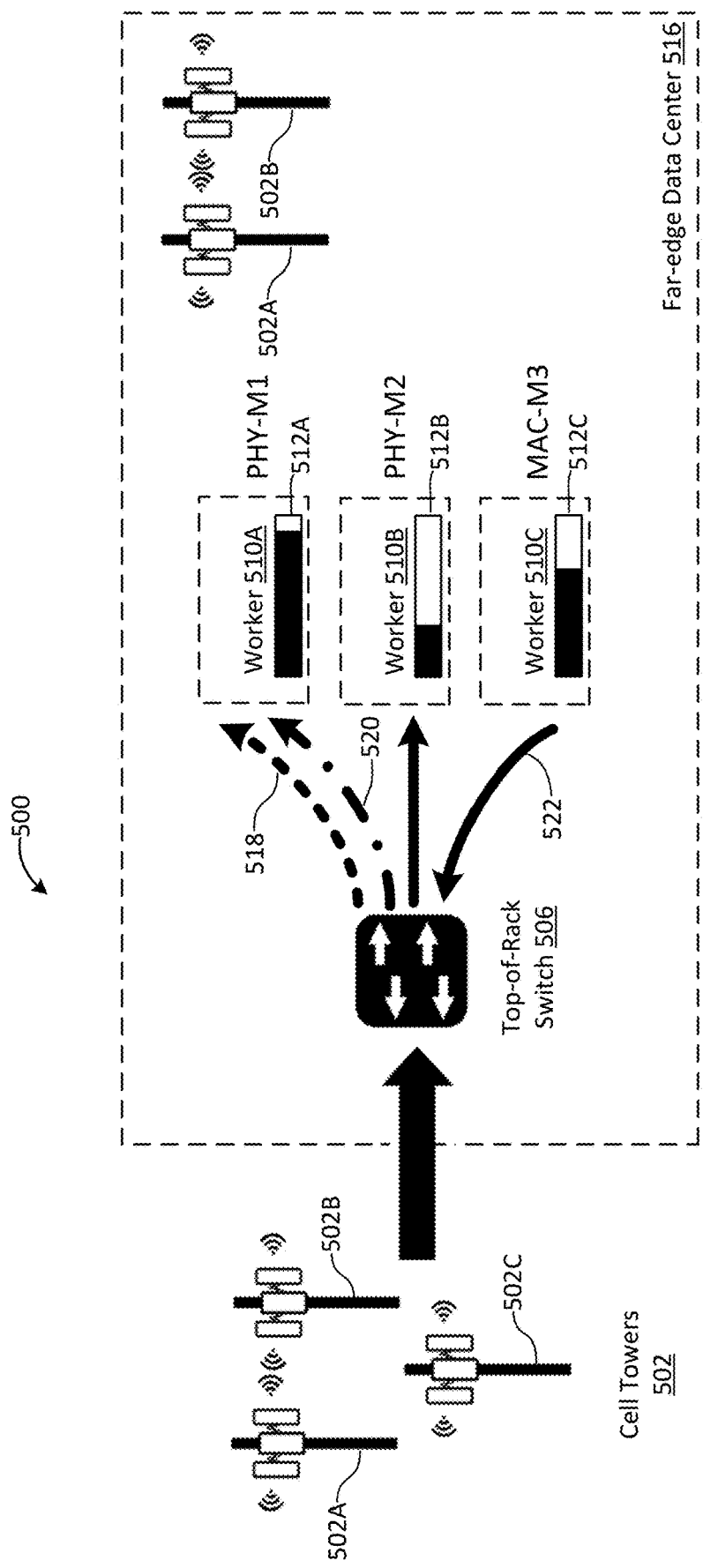
Figure 5B:
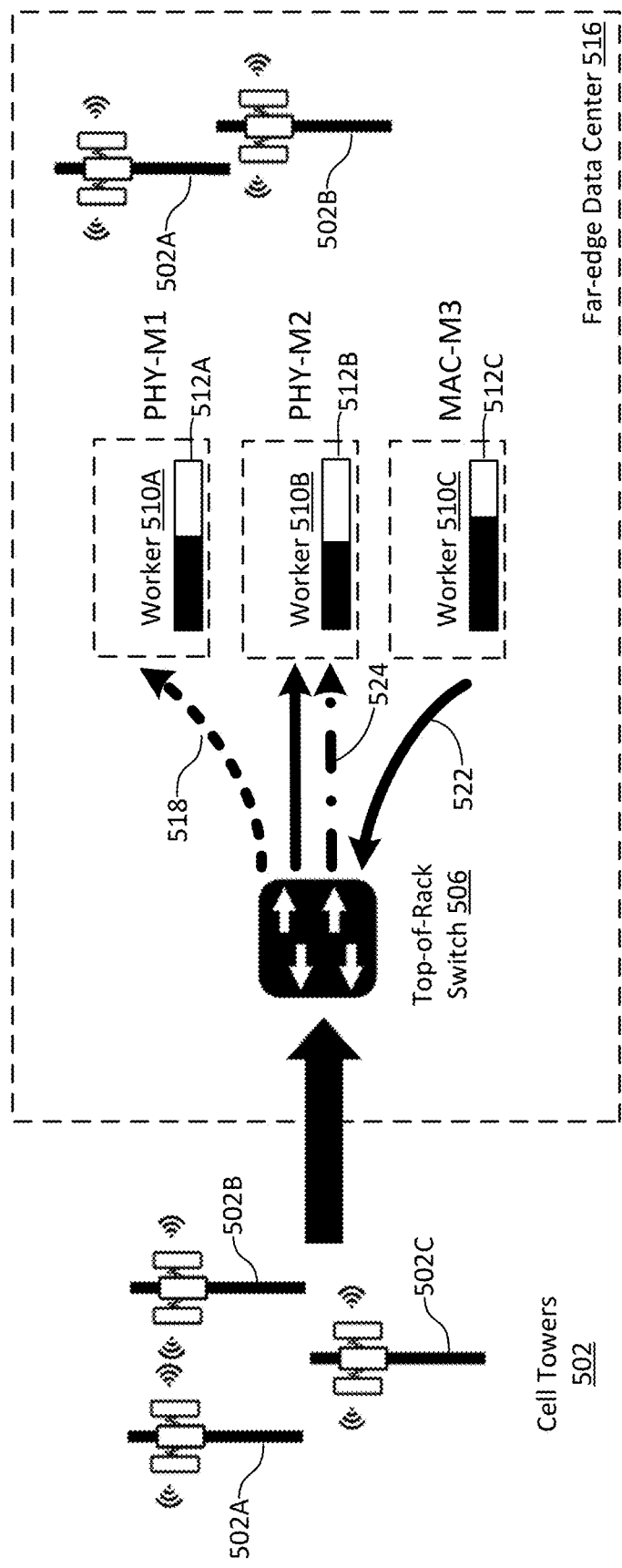

FIGS. 5A-B illustrate a system 400 depicting aspects of dynamic workload reallocation for worker overload by a programmable switch associated with a far-edge datacenter of a cloud RAN. As illustrated by FIG. 5A, system 500 comprises cell towers 502A-C and far-edge data center 516. Far-edge data center 516 comprises switch 506 (e.g., a ToR switch) and workers 510A-C, where each worker may correspond to a vRAN instance. As illustrated, each worker 510A-C may be associated with a queue 512A-C, respectively. While any combination of one or more RAN servers may host workers 510A-C, the RAN servers are not depicted in FIG. 5A.

Switch 506 may be a programmable switch, as described above, and may execute one or more policies for monitoring and keeping track of load information, making traffic steering decisions, and implementing the traffic steering decisions. For instance, the switch 506 may monitor a "system load" of data traffic based on a level of ingress data traffic at an ingress port and/or a level of egress data traffic at an egress port of switch. The switch 506 may further detect an availability of resources, such as vRAN instances, based on a "worker traffic allocation," which refers to a volume of data traffic directed to each worker from the switch. To determine whether a worker is becoming overloaded, the switch 506 may monitor a queue length for each worker 510A-C, where the queue length corresponds to a "worker load" or "workload" for each worker. Increased queue length may signal that the worker 510A-C is becoming overloaded, which may be due to the worker traffic allocation being too high and/or the processing of workflows by the worker 510A-C being too slow. In aspects, the switch 506 may also be able to detect resource conditions, such as a "server state" of one or more servers hosting the workers 510A-C. In aspects, server states may include "running state," "failure state," "offline state," and the like. When a server transitions from a running state to a failure state (e.g., when the server is experiencing a hardware or software failure) or an offline state (e.g., when the server is offline to undergo maintenance or powered-down for resource conservation), workers hosted by the server may become unavailable for processing workflows.

Switch 506 may further be configured, based on the policies, to make traffic steering decisions based on the system load, the worker load, and/or resource conditions (e.g., server state). For instance, switch 506 may map traffic from a particular cell tower to a particular worker. In response to making the traffic steering decisions (e.g., the cell-worker mapping), switch 506 may implement the traffic steering decision by altering packet headers of data traffic from the particular cell tower to specify the particular worker as the destination of the data traffic. In an example, switch 506 may determine that worker 510A is available and may make a decision to direct RAN data traffic from cell towers 502A and 502B to worker 510A for processing. In response to the decision, switch 506 may inspect RAN-specific packet headers (e.g., cell ID, subcarrier ID, etc.) to identify data traffic from cell towers 502A and 502B and may modify the packet headers to specify worker 510A as the destination (as illustrated by dashed arrows 518 and 520, respectively). A workload performed by worker 510A may comprise layer one (PHY) processing of the RAN data traffic from cell towers 502A and 502B. In aspects, it may be necessary for worker 510A to perform the layer one (PHY) processing in real-time. In contrast, worker 510C may perform layer two (MAC) processing on RAN data and may direct the processed RAN data traffic back to switch 406, as illustrated by arrow 522. As illustrated, a first queue length of queue 512A is greater than a second queue length of queue 512B and a third queue length of queue 512C. In aspects, the first queue length may be nearing a maximum queue length and worker 510A may be overloaded.

Similar to FIG. 5A, FIG. 5B illustrates system 500 including cell towers 502A-C and far-edge data center 516. Far-edge data center 516 comprises switch 506 (e.g., a ToR switch) and workers 510A-C, where each worker may correspond to a vRAN instance. In this case, switch 506 has detected that worker 510A has become overloaded (e.g., based on the first queue length of queue 512A illustrated by FIG. 5A). In aspects, worker 510A may be overloaded due to a workload allocation that was too high or workload processing that was too slow.

In this example, switch 506 may determine that worker 510B is available (e.g., based on the second queue length of queue 512B) and may make a decision to redirect the RAN data traffic from cell tower 502B to worker 510B for processing. In response to the decision, as illustrated by dashed arrow 524, switch 506 may inspect RAN-specific packet headers (e.g., cell ID, subcarrier ID, etc.) to identify data traffic from cell tower 502B and may modify the packet headers to specify worker 510B as the destination. The workload performed by worker 510B may also comprise layer one (PHY) processing of the RAN data traffic from cell tower 502B. In aspects, it may be necessary for worker 510B to perform the layer one (PHY) processing in real-time. Similar to FIG. 5A, worker 510C may perform layer two (MAC) processing on RAN data and may direct the processed RAN data traffic back to switch 506, as illustrated by arrow 522. After redirecting the data traffic, the first queue length of queue 512A has decreased and is substantially similar to the second queue length of queue 512B and the third queue length of queue 512C. As a result, the system load has been balanced by switch 506 across workers 510A-C of system 500.

Figure 6:
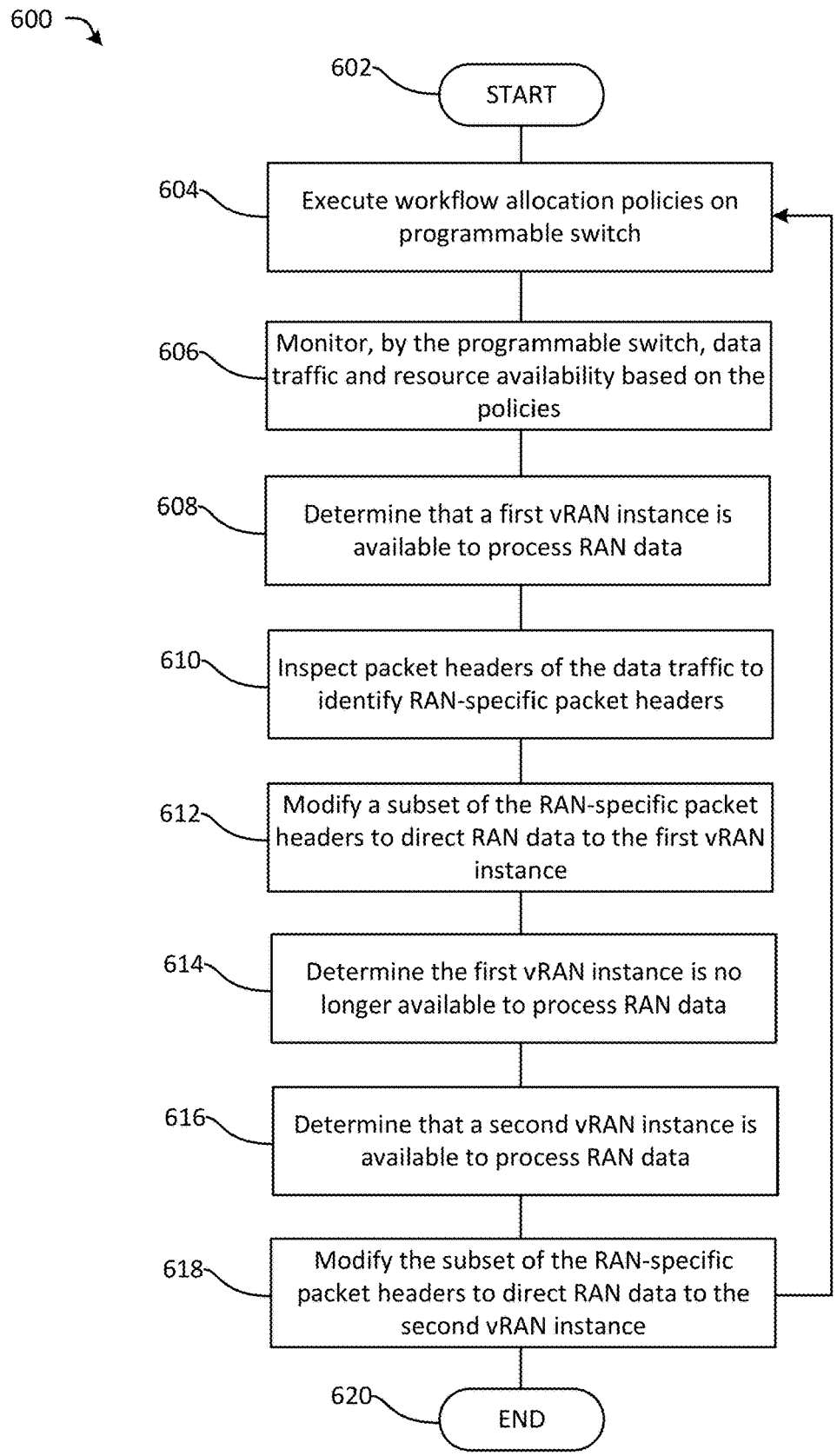
FIG. 6 illustrates an example method for dynamic workload allocation to vRANs by a programmable switch in accordance with aspects of the present disclosure.

FIG. 6 illustrates an example method for dynamic workload allocation to vRANs by a programmable switch. A general order of the operations for the method 600 is shown in FIG. 6. Generally, the method 600 begins with start operation 602 and ends with end operation 618. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1-5B, 7, and 8A-B. For example, aspects of method 600 may be performed by a programmable switch, such as switch 114 of FIG. 1, switch 212 of FIGS. 2A-B, switch 306 of FIG. 3, switch 406 of FIGS. 4A-B and switch 506 of FIGS. 5A-B.

Following start operation 602, at execute operation 604, a programmable switch associated with a far-edge datacenter of a cloud RAN may execute workflow allocation policies. Since switches are located in the path of data traffic, real-time network information (e.g., queue length, server state) can be leveraged for real-time RAN workload balancing. By leveraging the proximity and programmability of the switches, workflow allocation policies can be designed and applied on the RAN workloads in real-time without incurring the performance, energy, and capital cost overheads of traditional systems. In particular, the workflow allocation policies can be designed to enable a switch to inspect packet headers of incoming traffic, evaluate real-time network information, determine available vRAN instances to process the incoming traffic, and update the packet headers to steer the incoming traffic to the determined vRAN instances for processing—all in essentially real time. As network conditions change, e.g., vRANs become overloaded (e.g., queue length increases), servers hosting the vRANs fail, power down (e.g., at night), or undergo maintenance, or the volume of data traffic fluctuates (e.g., during peak mobile usage periods), the workflow allocation policies enable a programmable switch to dynamically redirect workloads to alternative vRANs for processing.

At monitor operation 606, based on the workflow allocation policies, the programmable switch can be programmed to monitor data traffic and resource availability. For instance, the switch may monitor a "system load" of data traffic based on a level of ingress data traffic at an ingress port and/or a level of egress data traffic at an egress port of switch. The switch may further detect an availability of resources, such as vRAN instances, based on a "worker traffic allocation," which refers to a volume of data traffic directed to each vRAN instance from the switch. To determine whether a worker is becoming overloaded, the switch may monitor a queue length for each vRAN instance, where the queue length corresponds to a "worker load" or "workload" for each vRAN instance. Increased queue length may signal that the vRAN instance is becoming overloaded, which may be due to the worker traffic allocation being too high and/or the processing of workflows by the vRAN instance being too slow. In aspects, the switch may also be able to detect resource conditions, such as a "server state" of one or more servers hosting the vRAN instances. In aspects, server states may include "running state," "failure state," "offline state," and the like. When a server transitions from a running state to a failure state (e.g., when the server is experiencing a hardware or software failure) or an offline state (e.g., when the server is offline to undergo maintenance or powered-down for resource conservation), vRAN instances hosted by the server may become unavailable for processing workflows.

At determine operation 608, the programmable switch may determine that a first vRAN instance is available to process a first workflow associated with RAN data. For example, the programmable switch may evaluate a plurality of vRAN instances to determine one or more vRAN instances are available for processing a first workflow associated with RAN data. In aspects the first workflow may be associated with layer one (PHY) processing or layer two (MAC) processing of RAN data. It may be determined that a vRAN instance available for processing is not overloaded, e.g., a vRAN instance that comprises a queue length that is not within a threshold of a maximum queue length. In some cases, it may be further determined that an available vRAN instance comprises a stable queue length (e.g., that is not increasing toward the threshold). It may also be determined that an available vRAN instance is not associated with a server having a server state of failure or offline. In response to evaluating the plurality of vRAN instances, the programmable switch may determine that the first vRAN instance is available to process a first workflow associated with RAN data.

At inspect operation 610, the programmable switch may inspect packet headers of incoming data traffic to identify RAN-specific headers. As described above, RAN workloads may include processing IQ samples from cell towers. To facilitate transmission of this type of data, IQ samples are often compressed and are transmitted via u-plane data packets with corresponding u-plane headers. In aspects, the workflow allocation policies may enable the programmable switch to recognize different types of RAN data based on inspecting RAN-specific packet headers. That is, although data packets associated with different operational planes may be interleved within a transmission stream, the switch may be programmed identify packets in the u-plane from packets in the c-plane by inspecting the RAN-specific fields of packet headers. Additionally or alternatively, the switch may be programmed to recognize RAN data originating from a particular cell tower (e.g., based on a cell ID, subcarrier ID, etc.).

At modify operation 612, the switch may modify a subset of the RAN-specific packet headers. For example, the switch may be programmed to process packets in different planes differently—giving preference to packets requiring real-time processing over packets with less stringent processing requirements. The switch may further be programmed to direct RAN data from a particular cell tower to an available RAN instance for processing. In aspects, the subset of RAN-specific packet headers may be modified to specify the first RAN instance as the destination so as to direct the subset of corresponding RAN data packets to the first RAN instance.

At determine operation 614, the programmable switch may determine that the first RAN instance is not available to process a second workflow associated RAN data. In aspects the second workflow may be associated with layer one (PHY) processing or layer two (MAC) processing of RAN data. It may be determined that the first vRAN instance is not available for processing when the first vRAN is overloaded, e.g., a queue length associated with the first vRAN instance is within a threshold of a maximum queue length. Additionally or alternatively, it may be determined that the first vRAN instance is associated with a server having a server state of failure or offline.

At determine operation 616, the programmable switch may determine that a second vRAN instance is available to process the second workflow associated with RAN data. For instance, it may be determined that the second vRAN instance is not overloaded, e.g., a queue length associated with the second vRAN instance is not within a threshold of a maximum queue length. Additionally, it may be determined that the second vRAN instance is not associated with a server having a server state of failure or offline.

At modify operation 618, the switch may modify the subset of the RAN-specific packet headers. In aspects, the subset of RAN-specific packet headers may be modified to specify the second RAN instance as the destination so as to direct the subset of corresponding RAN data packets to the second RAN instance.

An arrow is illustrated from operation 618 to operation 604 to indicate that flow may loop between operations 604-618, thereby dynamically allocating and reallocating RAN workflows based on techniques described herein. As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
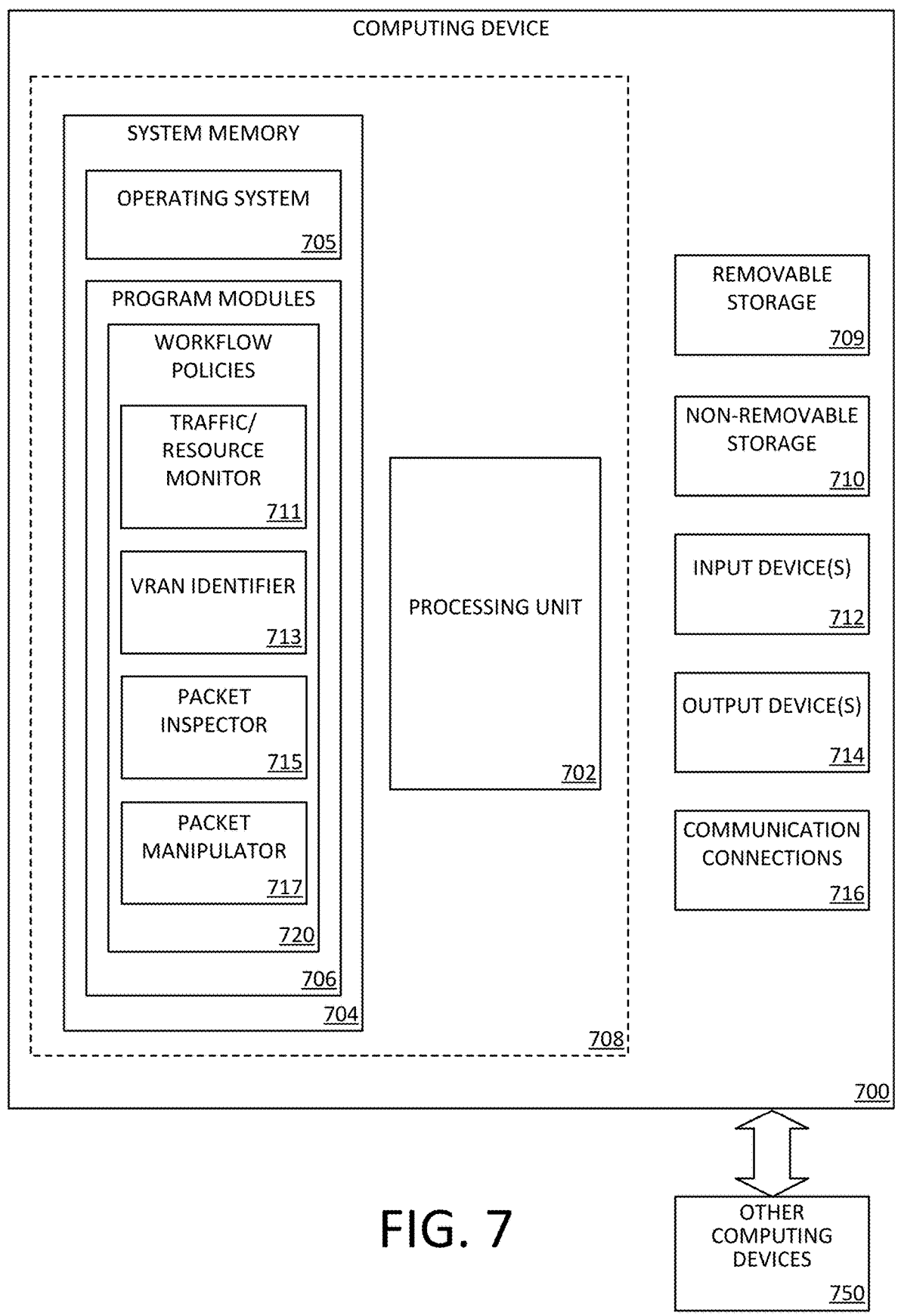
FIG. 7 is a block diagram illustrating example physical components of a computing device with which aspects of the disclosure may be practiced.

FIG. 7 is a block diagram illustrating physical components (e.g., hardware) of a computing device 700 (e.g., a programmable switch) with which aspects of the disclosure may be practiced. The computing device components described below may have computer executable instructions for implementing workflow policies 720 on a computing device (e.g., switch 114), including computer executable instructions for the workflow policies 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running workflow policies 720, such as one or more components and, in particular, traffic/resource monitor 711, vRAN identifier 713, packet inspector 715, and/or packet manipulator 717.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., workflow policies 720) may perform processes including, but not limited to, the aspects, as described herein. Other program modules that may be used in accordance with aspects of the present disclosure, and in particular for allocating workflows to vRAN instances, may include traffic/resource monitor 711, vRAN identifier 713, packet inspector 715, and/or packet manipulator 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
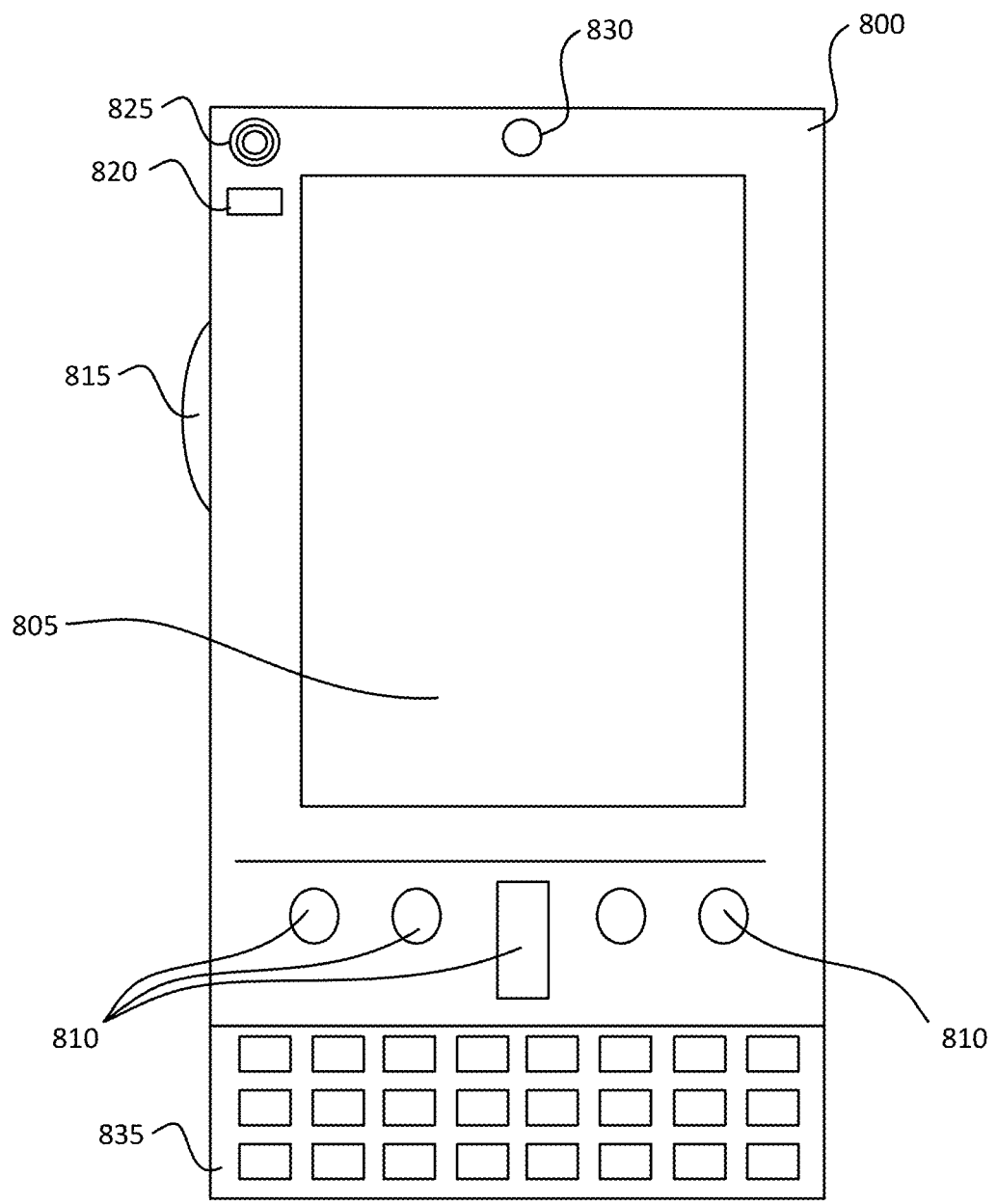
FIG. 8A is a simplified diagram of a mobile computing device with which aspects of the present disclosure may be practiced.
Figure 8B:
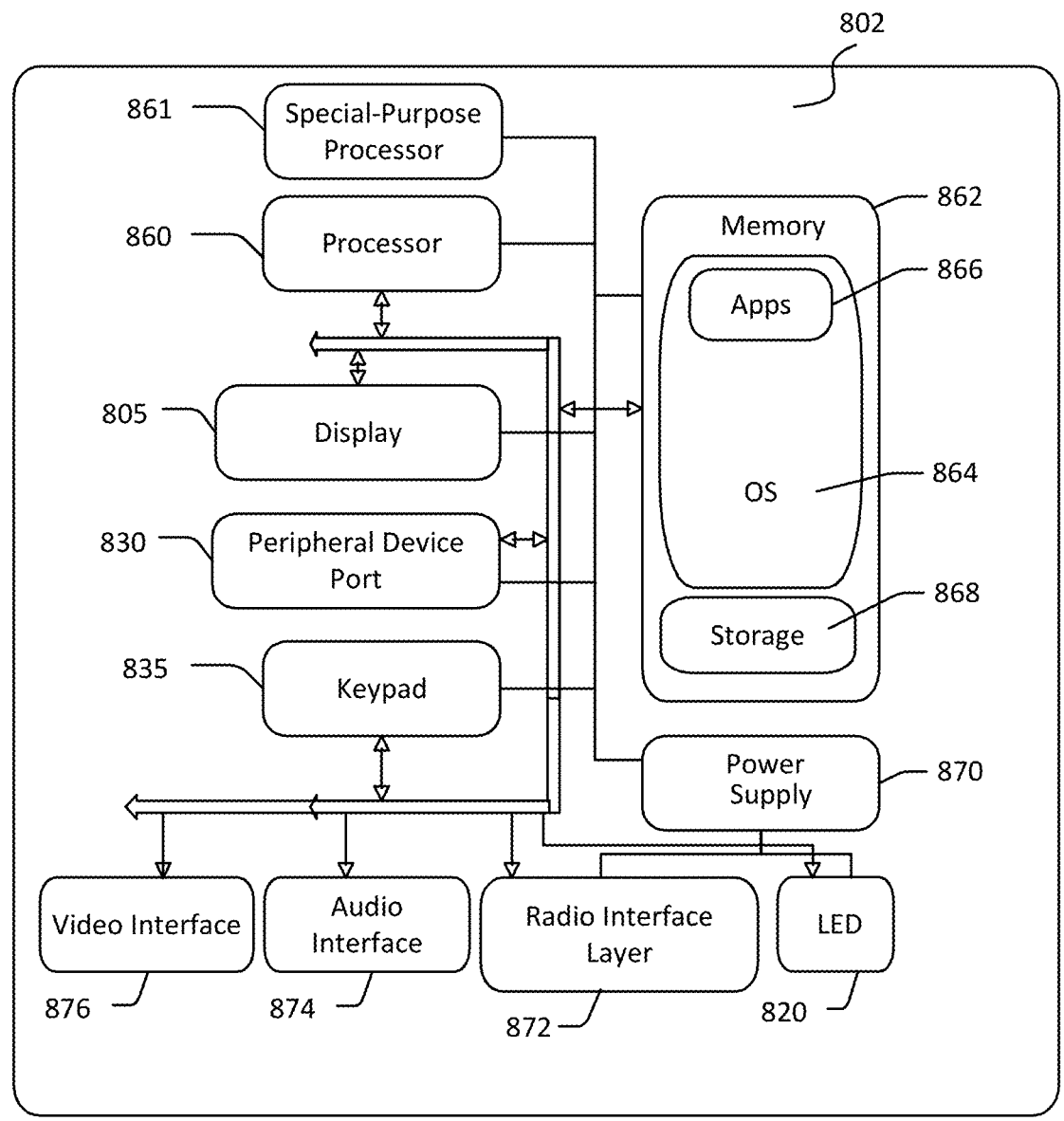
FIG. 8B is another simplified block diagram of a mobile computing device with which aspects of the present disclosure may be practiced.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for implementing workflow policies as described herein (e.g., traffic/resource monitor, vRAN identifier, packet inspector, and/or packet manipulator, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for RAN resource allocation using reinforcement learning according to at least the examples provided in the sections below.

In an aspect, a system is provided. The system includes at least one processor and a memory storing instructions that, when executed by the at least one processor, cause the system to perform a set of operations. The set of operations include executing, by a programmable switch of a far-edge datacenter, workflow allocation policies and, based on the workflow allocation policies, monitoring a volume of data traffic and an availability of a plurality of virtual RAN (vRAN) instances, where the plurality of vRAN instances are hosted by one or more RAN servers at the far-edge datacenter. The operations further include determining that a first vRAN instance of the plurality of vRAN instances is available to process a first workflow associated with RAN data. Additionally, the operations include inspecting packet headers of the data traffic to identify RAN-specific packet headers and modifying a subset of the RAN-specific packet headers to direct a subset of the RAN data to the first vRAN instance for processing the first workflow.

In another aspect, a method for dynamically allocating workflows to one or more virtual radio access network (vRAN) instances is provided. The method includes executing, by a programmable switch, workflow allocation policies and, based on the workflow allocation policies, monitoring a volume of data traffic and an availability of a plurality of vRAN instances. The plurality of vRAN instances may be hosted by one or more RAN servers at a far-edge datacenter, where the availability of the plurality of vRAN instances is determined based on one of a workload associated with each vRAN instance or a server state associated with a RAN server hosting each vRAN instance. The method further includes determining that a first vRAN instance of the plurality of vRAN instances is available to process a first workflow associated with RAN data. Additionally, the method includes inspecting packet headers of the data traffic to identify RAN-specific packet headers and modifying a subset of the RAN-specific packet headers to direct a subset of RAN data to the first vRAN instance for processing the first workflow.

In yet another aspect, a method for allocating workflows at a far-edge datacenter is provided. The method includes executing, by a programmable switch of the far-edge datacenter, workflow allocation policies and, based on the workflow allocation policies, monitoring a volume of data traffic and an availability of a plurality of virtual RAN (vRAN) instances, where the plurality of vRAN instances are hosted by one or more RAN servers at the far-edge datacenter. The method further includes determining that a first vRAN instance of the plurality of vRAN instances is available to process a first workflow associated with RAN data. Additionally, the method includes inspecting packet headers of the data traffic to identify RAN-specific packet headers, where a subset of RAN-specific packet headers are associated with RAN data originating at a cell tower of a plurality of cell towers, and modifying the subset of the RAN-specific packet headers to cause the subset of RAN data from the cell tower to be directed to the first vRAN instance for processing the first workflow.

Any of the one or more above aspects in combination with any other of the one or more aspect. Any of the one or more aspects as described herein.

What is claimed is:

1. A system comprising:
   at least one processor; and
   memory storing instructions that, when executed by the at least one processor, cause the system to perform a set of operations, the set of operations comprising:
   executing, by a programmable switch of a far-edge datacenter as a radio access network (RAN) server, workflow allocation policies;
   based on the workflow allocation policies, monitoring a volume of data traffic and an availability of a plurality of virtual radio access network (vRAN) instances, wherein the plurality of vRAN instances is hosted by one or more RAN servers at the far-edge datacenter, and a vRAN instance represents a network function virtualization for processing control of the RAN;
   determining that a first vRAN instance of the plurality of vRAN instances is available to process a first workflow associated with RAN data;
   determining that the first vRAN instance is not available to process a second workflow associated with RAN data;
   determining that a second vRAN instance is available to process the second workflow associated with RAN data;
   inspecting packet headers of the data traffic to identify RAN-specific packet headers;
   modifying, by the programmable switch of the far-edge datacenter, a subset of the RAN-specific packet headers to direct a subset of the RAN data to the first vRAN instance for processing the first workflow; and
   modifying the subset of the RAN-specific packet headers to redirect the subset of the RAN data to the second vRAN instance for processing the second workflow.

2. The system of claim 1, wherein the inspecting packet headers further comprises inspecting layer one data of the data traffic according to the Open System Interconnection model, and the availability of the plurality of vRAN instances is determined based on a data traffic allocation associated with each vRAN instance and a workload associated with each vRAN instance.

3. The system of claim 2, wherein the workload associated with each vRAN instance is determined based on a queue length for each vRAN instance.

4. The system of claim 1, wherein the availability of the plurality of vRAN instances is determined based on a server state associated with a RAN server hosting each vRAN instance.

5. The system of claim 1, wherein the subset of the RAN-specific packet headers is associated with a cell tower of a plurality of cell towers, and wherein modifying the subset of the RAN-specific packet headers causes the subset of the RAN data from the cell tower to be directed to the first vRAN instance.

6. The system of claim 1, wherein determining that the first vRAN instance is not available to process the second workflow comprises determining that the first vRAN instance is overloaded.

7. The system of claim 1, wherein determining that the first vRAN instance is not available to process the second workflow comprises determining that a RAN server hosting the first vRAN instance is associated with one of a failure state or an offline state.

8. The system of claim 1, wherein determining that the first vRAN instance is overloaded is based on examining a queue length of the first vRAN instance.

9. The system of claim 1, wherein the RAN data comprises one or more IQ samples, and wherein the first workflow comprises processing the one or more IQ samples.

10. The system of claim 9, wherein the processing of the one or more IQ samples is performed in real time.

11. The system of claim 1, wherein the programmable switch executes the workflow allocation policies on data traffic originating from one or more first cell towers, and wherein the set of operations further comprises:
executing in parallel, by a second programmable switch of the far-edge datacenter, the workflow allocation policies on data traffic originating from one or more second cell towers.

12. A method for dynamically allocating workflows to one or more virtual radio access network (vRAN) instances, comprising:
executing, by a programmable switch of a far-edge datacenter as a radio access network (RAN) server, workflow allocation policies;
based on the workflow allocation policies, monitoring a volume of data traffic and an availability of a plurality of vRAN instances, wherein the plurality of vRAN instances is hosted by one or more RAN servers at the far-edge datacenter, wherein a vRAN instance represents a network function virtualization for processing control of the RAN, and wherein the availability of the plurality of vRAN instances is determined based on one of a workload associated with each vRAN instance or a server state associated With a RAN server hosting each vRAN instance;
determining that a first vRAN instance of the plurality of vRAN instances is available to process a first workflow associated with RAN data;
determining that the first vRAN instance is not available to process a second workflow associated with RAN data;
determining that a second vRAN instance is available to process the second workflow associated with RAN data;
inspecting packet headers of the data traffic to identify RAN-specific packet headers;
modifying, by the programmable switch of the far-edge datacenter, a subset of the RAN-specific packet headers to direct a subset of RAN data to the first vRAN instance for processing the first workflow; and
modifying the subset of the RAN-specific packet headers to redirect the subset of RAN data to the second vRAN instance for processing the second workflow.

13. The method of claim 12, wherein the inspecting packet headers further comprises inspecting layer one data of the data traffic according to the Open System Interconnection model, and the workload associated with each vRAN instance is determined based on a queue length for each vRAN instance.

14. The method of claim 12, wherein determining that the first vRAN instance is not available to process the second workflow comprises determining that the first vRAN instance is overloaded.

15. The method of claim 12, wherein determining that the first vRAN instance is not available to process the second workflow comprises determining that a RAN server hosting the first vRAN instance is associated with one of a failure state or an offline state.

16. The method of claim 12, wherein the RAN data comprises one or more IQ samples, and wherein the first workflow comprises processing the one or more IQ samples.

17. A method for allocating workflows at a far-edge datacenter, the method comprising:
executing, by a programmable switch of the far-edge datacenter as a radio access network (RAN) server, workflow allocation policies;
based on the workflow allocation policies, monitoring a volume of data traffic and an availability of a plurality of virtual radio access network (vRAN) instances, wherein the plurality of vRAN instances is hosted by one or more RAN servers at the far-edge datacenter, and a vRAN instance represents a network function virtualization for processing control of the RAN;
determining that a first vRAN instance of the plurality of vRAN instances is available to process a first workflow associated with RAN data;
determining that the first vRAN instance is not available to process a second workflow associated with RAN data;
determining that a second vRAN instance is available to process the second workflow associated with RAN data;
inspecting packet headers of the data traffic to identify RAN-specific packet headers, wherein a subset of the RAN-specific packet headers is associated with a subset of RAN data originating at a cell tower of a plurality of cell towers;
modifying, by the programmable switch of the far-edge datacenter, the subset of the RAN-specific packet headers to cause the subset of RAN data from the cell tower to be directed to the first vRAN instance for processing the first workflow; and
modifying the subset of the RAN-specific packet headers to cause the RAN data from the cell tower to be redirected to the second vRAN instance for processing the second workflow.

18. The method of claim 17, wherein the first workflow and the second workflow comprise real-time processing of layer one data of the RAN data according to the Open System Interconnection model.

19. The method of claim 17, wherein the inspecting packet headers further comprises inspecting layer one data of the data traffic, and the availability of the plurality of vRAN instances is determined based on a data traffic allocation associated with each vRAN instance and a workload associated with each vRAN instance.

20. The method of claim 17, wherein determining that the first vRAN instance is not available to process the second workflow comprises determining that the first vRAN instance is overloaded.

* * * * *